US009469157B2

(12) United States Patent
French

(10) Patent No.: US 9,469,157 B2
(45) Date of Patent: Oct. 18, 2016

(54) BICYCLE FREECOASTER HUB

(71) Applicants: TEDDY FORMOSA CO., LTD., Taichung (TW); BEAR CORPORATION, Norwalk, CA (US)

(72) Inventor: George French, S.Yorkshire (GB)

(73) Assignees: TEDDY FORMOSA CO., LTD., Taichung (TW); BEAR CORPORATION, Norwalk, CA (US)

( * ) Notice: Subject to any disclaimer, the term of this patent is extended or adjusted under 35 U.S.C. 154(b) by 21 days.

(21) Appl. No.: 14/729,184

(22) Filed: Jun. 3, 2015

(65) Prior Publication Data

US 2015/0352898 A1 Dec. 10, 2015

(30) Foreign Application Priority Data

Jun. 5, 2014 (TW) .............................. 103209920 U
Jun. 5, 2014 (TW) .............................. 103209921 U
Feb. 16, 2015 (TW) .............................. 104202613 U

(51) Int. Cl.
*F16D 41/36* (2006.01)
*B60B 27/04* (2006.01)
*B60B 27/02* (2006.01)

(52) U.S. Cl.
CPC ........... *B60B 27/047* (2013.01); *B60B 27/023* (2013.01); *F16D 41/36* (2013.01)

(58) Field of Classification Search
CPC ... B60B 27/023; B60B 27/047; F16D 41/24; F16D 41/36; F16D 13/24–13/30
See application file for complete search history.

(56) References Cited

U.S. PATENT DOCUMENTS

| | | | | |
|---|---|---|---|---|
| 1,376,033 | A * | 4/1921 | Page | B62L 5/10 192/12 B |
| 4,593,799 | A * | 6/1986 | Ozaki | F16D 41/36 192/46 |
| 5,718,315 | A * | 2/1998 | Chen | B60B 27/023 192/45.1 |
| 6,244,405 | B1* | 6/2001 | Chen | B60B 27/0005 192/64 |
| 7,712,593 | B2 | 5/2010 | Göring | |
| 2002/0179394 | A1* | 12/2002 | Wu | F16D 41/36 192/64 |
| 2003/0034220 | A1* | 2/2003 | Chen | F16D 41/36 192/64 |

* cited by examiner

*Primary Examiner* — Richard Lorence
(74) *Attorney, Agent, or Firm* — Browdy and Neimark, PLLC

(57) ABSTRACT

A bicycle freecoaster hub includes a clutch to provide a clutching effect during riding. The clutch has a clutch member, and first and second resistance members. The first resistance member is located inside the clutch member and includes a cylinder and flanges at each end. The second resistance member includes a ring sleeve part located inside the clutch member and mounted on the cylinder of the first resistance member and abutted against the first flange of the first resistance member. An elastic member is sleeved onto the cylinder of the first resistance member and abutted between the outer flange of the first resistance member and the second resistance member, so as to provide sufficient resistance for the clutch member. The hub bearings are arranged in such a way that the drive mechanism is isolated from axial loads.

20 Claims, 11 Drawing Sheets

BICYCLE FREECOASTER HUB

BACKGROUND OF THE INVENTION

1. Field of the Invention

The present disclosure relates to a bicycle, more particularly to a bicycle freecoaster hub.

2. Description of the Related Art

In a so-called freecoaster hub, a clutch member is driven by the chain sprocket to move axially along an axle, and while a pedal of a bicycle is pushed to drive the chain sprocket to rotate forward, the clutch member is driven to form an engagement state with the hub shell and, at this time, the hub shell and the chain sprocket can be rotated simultaneously. When the pedal is slightly pushed reversely to drive the chain sprocket to rotate in reverse, the engagement state between the clutch member and the hub shell will be released and, at this time, the hub shell can be freely rotated.

In order to ensure the clutch member is initially only axially movable along the axle and not rotated with the chain sprocket before the clutch member is engaged, a resistance unit is usually disposed between the clutch member and the axle to provide a resistance effect on the clutch member. For example, U.S. Pat. No. 7,712,593 disclosed a freecoaster hub including a plurality of springs and a plurality of steel balls built in an axle thereof. Cooperation of each steel ball and elastic action of the spring can apply resistance on the clutch member. However, the relationship between the clutch member and the steel balls is a high stress point-contact. On the one hand, the surface of the clutch member is easy to be worn by the steel balls, and on the other hand, the resistance provided by the steel balls is not consistent for the clutch member, resulting in that transmission failure may be occurred to impair stability of the driving power transmission during operation of the clutch member.

In addition, in order to meet different rider's demands, the clutch must have an adjustable stroke (i.e. distance of pushing the pedal). In aforesaid prior-art patent, for adjusting the stroke of the clutch, the user must insert a screwdriver into the axle to rotate the screw, to enable the screw to drive a rod to move axially along the axle, and a bolt will be pushed during the movement of the rod. The bolt is radially inserted into an adjusting ring to be mounted on the adjusting ring, so the adjusting ring is also pushed toward the clutch simultaneously while the bolt is pushed, resulting in that a distance between the adjusting ring and the clutch is shortened and the effect of adjusting the stroke can be achieved. Obviously, the prior-art patent has a problem of complicated structure. In addition, the axle of the prior-art patent must be performed a specific process for cooperation with the screw and the rod, and it causes more process cost and also negatively affects the structural strength of the axle. There is still plenty of room for improvement in the whole structure of the existing bicycle freecoaster hub.

On the other hand, in aforesaid prior-art patent, the hub shell and the axle are assembled together by several ball bearing units. However, the general ball bearing units have insufficient location and therefore capability in bearing an axial load, so if the hub is born an axial load exceeding the acceptable range of the smaller ball bearing units during the operation, the ball bearing units may easily be damaged, and structure of the chain sprocket or other component may possibly be affected.

SUMMARY OF THE INVENTION

A primary objective of the present disclosure is to provide a bicycle freecoaster hub capable of providing sufficient resistance for the clutch, to ensure stability of driving power transmission.

In order to achieve the primary objective, the bicycle freecoaster hub of the present disclosure includes an axle, a hub shell, a chain sprocket and a clutch. The hub shell is rotatably sleeved onto the axle. The chain sprocket is rotatably sleeved onto an end of the axle and has a screw part inserted into the hub shell via an end of the hub shell. The clutch is disposed in the hub shell and includes a clutch member, a first resistance member, a second resistance member and an elastic member. The clutch member includes a threaded hole screwed with the screw part of the chain sprocket and a sleeving hole coaxially communicated with the threaded hole, and the axle passes through the threaded hole and the sleeving hole both. The first resistance member is disposed inside the sleeving hole of the clutch member and has a cylinder rotationally fixed to the axle and provided with an outer flange at one end thereof, and a ring flange located at the other end of the cylinder and having an outer diameter larger than that of the cylinder, such that a holding wall is defined at a junction portion between the ring flange and the cylinder. The second resistance member has a ring sleeve part disposed on the clutch member and rotatably sleeved onto the cylinder of the first resistance member, and an inner flange located on an inner ring surface of the ring sleeve part such that a stepped surface is formed between the inner flange and the ring sleeve part. The ring sleeve part has an outer ring surface thereof located inside the sleeving hole of the clutch member, and an end surface thereof abutted against the holding wall of the first resistance member. The elastic member is sleeved onto the cylinder of the first resistance member and elastically abutted between the outer flange of the first resistance member and the stepped surface of the second resistance member. In addition, the second resistance member is further provided with two opposite engagement features at an outer ring surface thereof. The two engagement features are located in corresponding engagement grooves of the clutch member, so that the second resistance member can be driven by the clutch member to rotate around the cylinder of the first resistance member. As the second resistance member is driven around the first resistance member, the movement is resisted due to the force applied by the elastic member.

Therefore, by means of the elastic member, the second resistance member can provide a sufficient resistance on the clutch member to ensure that the clutch member is not rotatable under a driving force with a certain degree. However, when the driving force applied on the clutch member overcomes the force applied on the second resistance member by the elastic member, the second resistance member and the clutch member are rotated simultaneously. By using materials such as plastic with a lower dynamic coefficient of friction than their static coefficient of friction, any undesirable losses due to the resistance mechanism are minimized.

In addition, a secondary objective of the present disclosure is to provide a bicycle freecoaster hub, and the stroke of the clutch of the bicycle freecoaster hub can be adjusted without disassembly and special process.

In order to achieve the secondary objective, the bicycle freecoaster hub of the present disclosure further includes a clutch stroke adjusting device which is disposed inside the hub shell and includes a first adjusting member and a second adjusting member. The first adjusting member includes a tooth groove which has a first radial abutment surface and a first guiding surface linked with the first radial abutment surface. The second adjusting member includes a tooth part which has a second radial abutment surface and a second guiding surface linked with the second radial abutment surface, and an adjusting hole penetrating through the tooth part. The first radial abutment surface of the first adjusting member and the second radial abutment surface of the second adjusting member are corresponding to each other, and the first guiding surface of the first adjusting member and the second guiding surface of the second adjusting member are abutted with each other. An urging member is driven to axially move along the adjusting hole for pushing the first radial abutment surface of the tooth groove of the first adjusting member, so that the second adjusting member can be forced to move relative to the first adjusting member, and a distance between the second adjusting member and a driving ring disposed in the hub shell can be shortened subsequently, resulting in that the effect of adjusting the stroke of the clutch can be achieved.

Moreover, another objective of the present disclosure is to provide a bicycle freecoaster hub capable of bearing more axial load.

In order to achieve the objective, the axle has a first outer shoulder portion at an end thereof, and the hub shell has a first inner shoulder portion and a second inner shoulder portion, and the chain sprocket has a second outer shoulder portion. The hub shell and the axle are assembled together by a first ball bearing unit and a second ball bearing unit. The inner end surface of the first ball bearing unit is abutted against the first outer shoulder portion of the axle and the first inner shoulder portion of the hub shell, and the outer end surface of the first ball bearing unit is abutted against a retaining member disposed in the hub shell and a first end collar disposed on the axle. The inner and outer end surfaces of the second ball bearing unit are abutted against the second inner shoulder portion of the hub shell and the second outer shoulder portion of the chain sprocket, respectively. Therefore, such structural configuration can efficiently improve the axial load bearing ability of the bicycle freecoaster hub of the present disclosure.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
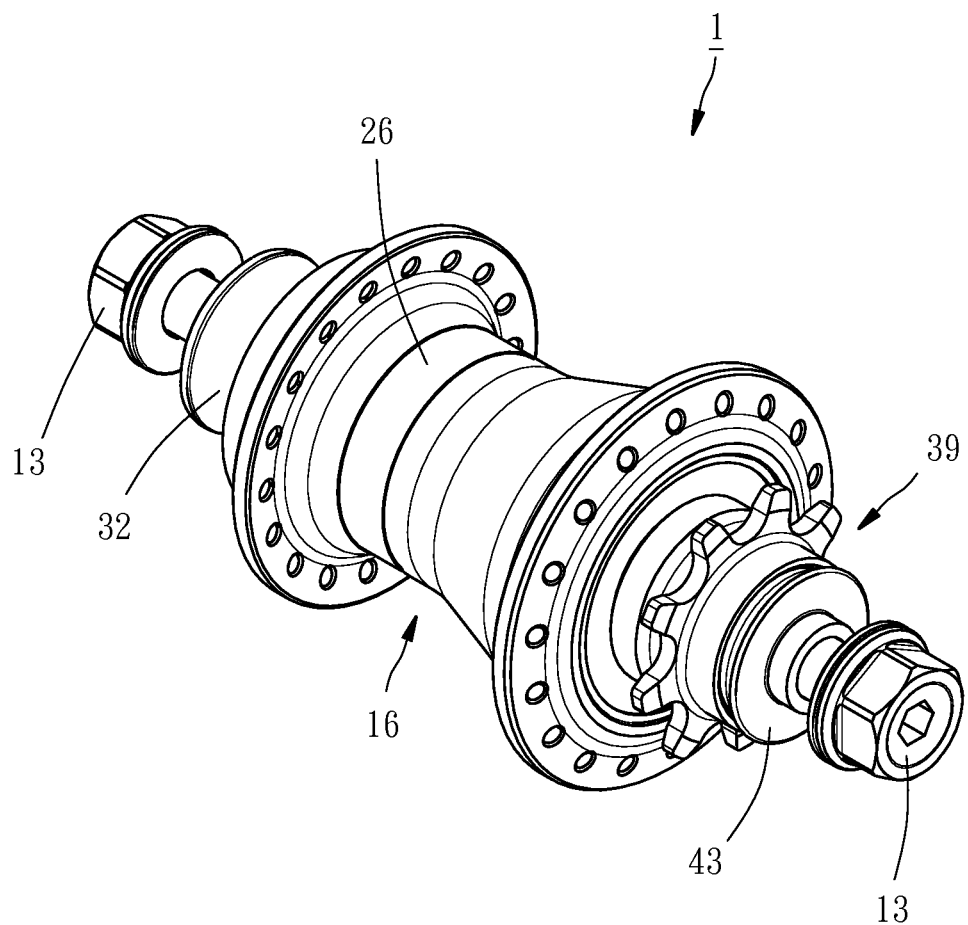
FIG. 1 is a perspective assembled view of the present disclosure.

Reference will now be made in detail to the exemplary embodiments of the present disclosure, which are illustrated in the accompanying drawings. Therefore, it is to be understood that the following is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
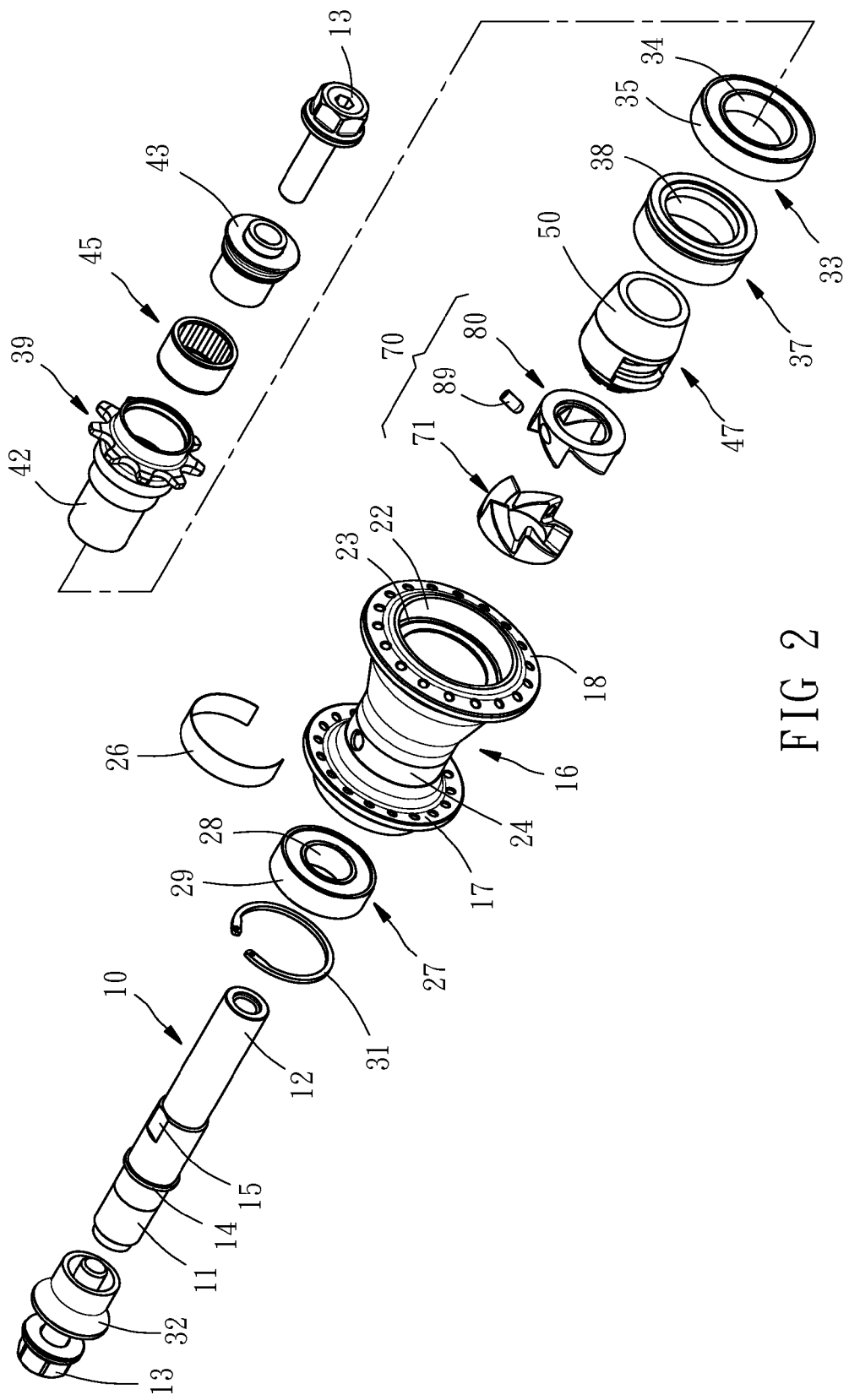
FIG. 2 is an exploded view of the present disclosure.

Please refer to FIG. 1 and FIG. 2. A freecoaster hub of the present disclosure 1 includes an axle 10, a hub shell 16, a first ball bearing unit 27, a retaining member 31, a first end collar 32, a second ball bearing unit 33, a driving ring 37, a chain sprocket 39, a second end collar 43, a needle roller bearing unit 45, a clutch 46 and a clutch stroke adjusting device 70.

The axle 10 has a first end 11 and a second end 12 which are fastened to the rear dropouts of a bicycle by bolts 13. In addition, the axle 10 is provided with a first outer shoulder portion 14 at an outer peripheral surface of the first end 11 thereof and a first plane portion 15 at a central part thereof.

The hub shell 16 rotates around the axle 10 and has a first flange 17 and a second flange 18. The first flange 17 of the hub shell 16 corresponds to the first end 11 of the axle 10. Please refer to FIG. 8. A retaining ring groove 19, a first bearing seat 20 abutted with the retaining ring groove 19, and a first inner shoulder portion 21 abutted with the first bearing seat 20 are formed on an inner peripheral surface of the first flange 17 of the shell 16 in order from exterior to interior. The second flange 18 of the hub shell 16 corresponds to the second end 12 of the axle 10. A second bearing seat 22 and a second inner shoulder portion 23 abutted with the second bearing seat 22 are formed on an inner peripheral surface of the second flange 18 of the shell 16 in order from exterior to interior. In addition, as shown in the FIG. 2, the hub shell 16 has a groove 24 on an outer peripheral surface of the shell 16 close to the first flange 17 thereof and a radial hole 25 located in the groove 24. A dust-proof cover 26 is disposed inside the groove 24 to block the radial hole 25, so as to prevent outside dust or water from entering into hub shell 16.

Figure 8:
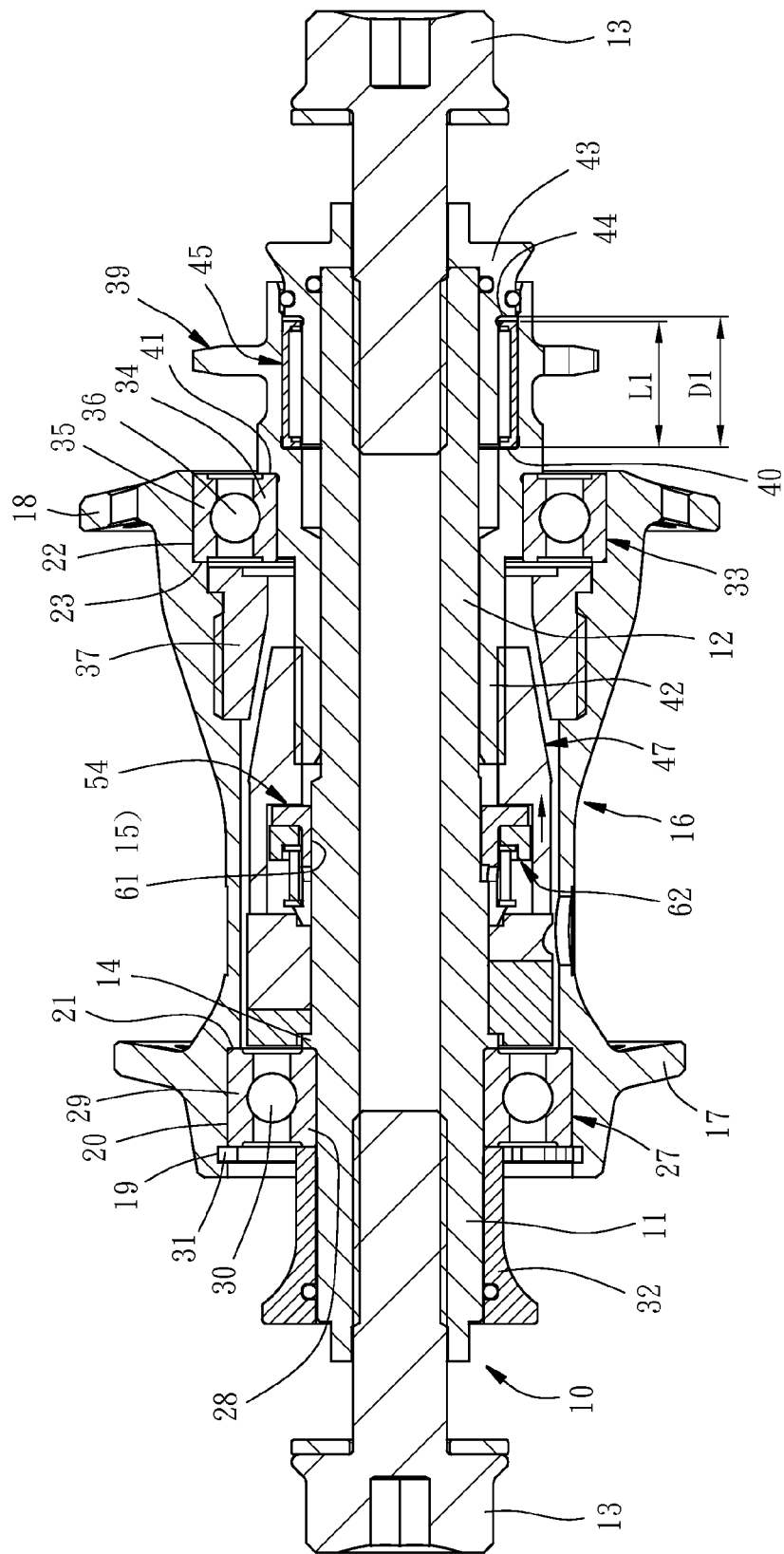
FIG. 8 is a cross-sectional view of assembly of the present disclosure, showing that the clutch member is not engaged yet.

As shown in FIG. 2 and FIG. 8, the first ball bearing unit 27 is sleeved onto the first end 11 of the axle 10 and mounted in the first bearing seat 20 of the hub shell 16. The first ball bearing unit 27 is provided with a first inner ring 28, a first outer ring 29 around the first inner ring 28, and a plurality of first balls 30 disposed between the first inner ring 28 and the first outer ring 29. An inner end surface of the first inner ring 28 is abutted against the first outer shoulder portion 14 of the axle 10, and an inner end surface of the first outer ring 29 is abutted against the first inner shoulder portion 21 of the hub shell 16.

The retaining member 31 is disposed in the retaining ring groove 19 of the hub shell 16 and abutted against an outer end surface of the first outer ring 29 of the first ball bearing unit 27, such that the retaining member 31 is in cooperation with the first inner shoulder portion 21 of the hub shell 16 for retaining the first outer ring 29 of the first ball bearing unit 27. However, it should be additionally explained that the retaining member 31 is a C-shaped ring fastener in this exemplary embodiment, but the present disclosure is not limited thereto. A screw nut or a tapered bushing can also be adopted as the retaining member 31, so long as the hub shell 16 has the corresponding structure (such as screw thread or tapered groove) for being assembled with the retaining member 31, and the first outer ring 29 of the first ball bearing unit 27 can be retained by the retaining member 31 after the assembling is completed.

As shown in the FIG. 2 and FIG. 8, the first end collar 32 is sleeved onto the first end 11 of the axle 10 and abutted against the outer end surface of the first inner ring 28 of the first ball bearing unit 27 at an end thereof, so that the first end collar 32 is in cooperation with the first outer shoulder portion 14 of the axle 10 to position the first inner ring 28 of the first ball bearing unit 27.

As shown in FIG. 2 and FIG. 8, the second ball bearing unit 33 is sleeved onto the second end 12 of the axle 10 and mounted inside the second bearing seat 22 of the hub shell 16. The second ball bearing unit 33 is provided with a second inner ring 34, a second ring 35 around the second inner ring 34, and a plurality of second balls 36 disposed between the second inner ring 34 and the second outer ring 35. An inner end surface of the second outer ring 35 is abutted against the second inner shoulder portion 23 of the hub shell 16.

The driving ring 37 is disposed in and fastened on an inner peripheral surface of the second flange 18 of the hub shell 16 and provided with an inner cone surface 38.

As shown in FIG. 2 and FIG. 8, the chain sprocket 39 is sleeved onto the second end 12 of the axle 10 and inserted into the second flange 18 of the hub shell 16 via the second inner ring 34 of the second ball bearing unit 33. The chain sprocket 39 is mainly assembled with a chain (not shown in figures), so that the chain sprocket 39 can be driven by the chain to rotate relative to the axle 10. The chain sprocket 39 is provided with a third inner shoulder portion 40 and a second outer shoulder portion 41 at inner and outer peripheral surfaces thereof, respectively. The second outer shoulder portion 41 is abutted against the outer end surface of the second inner ring 34 of the second ball bearing unit 33 and used to position the second inner ring 34 of the second ball bearing unit 33. In addition, the chain sprocket 39 is further provided with a screw part 42 at one end thereof. The screw part 42 is placed in the second flange 18 of the hub shell 16 and inserted into the driving ring 37.

As shown in FIG. 2 and FIG. 8, the second end collar 43 is sleeved onto the second end 12 of the axle 10 and inserted into the chain sprocket 39. In addition, the second end collar 43 is provided with a third outer shoulder portion 44 at an outer peripheral surface thereof, and the third outer shoulder portion 44 is opposite to the third inner shoulder portion 40 of the chain sprocket 39.

As shown in FIG. 2 and FIG. 8, the needle roller bearing unit 45 is sleeved onto the second end collar 43 and located between the third inner shoulder portion 40 of the chain sprocket 39 and the third outer shoulder portion 44 of the second end collar 43, and configured for supporting the chain sprocket 39. In addition, an axial length L1 of the needle roller bearing unit 45 is smaller than the distance D1 between the third inner shoulder portion 40 of the chain sprocket 39 and the third outer shoulder portion 44 of the second end collar 43, so that the needle roller bearing unit 45 can be axially movable along the axle 10 between the third inner shoulder portion 40 of the chain sprocket 39 and the third outer shoulder portion 44 of the second end collar 43 and that the chain sprocket 39 is therefore not located axially by the needle roller bearing unit 45.

Figure 3:
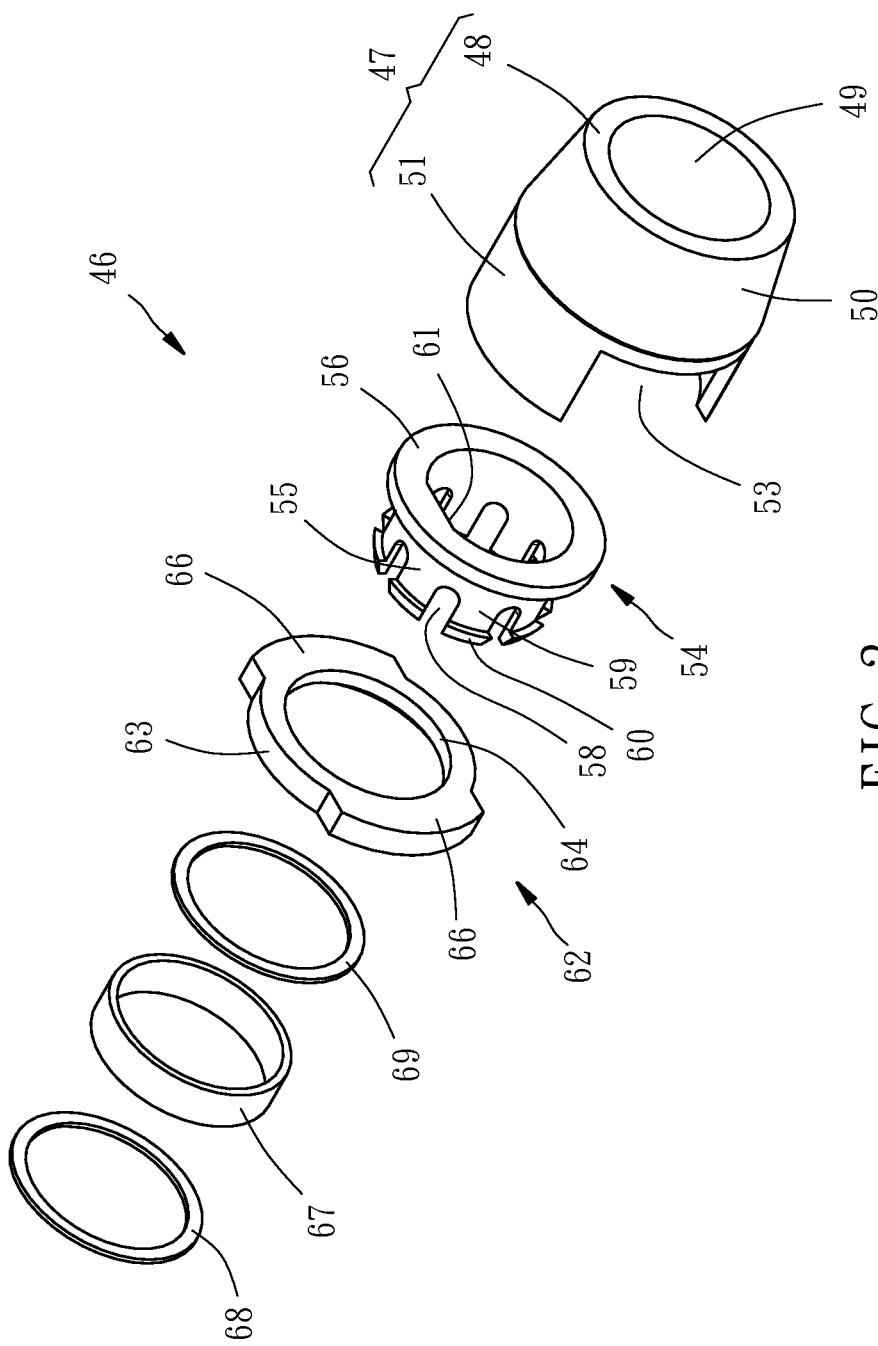
FIG. 3 is an exploded view of the clutch of the present disclosure.
Figure 4:
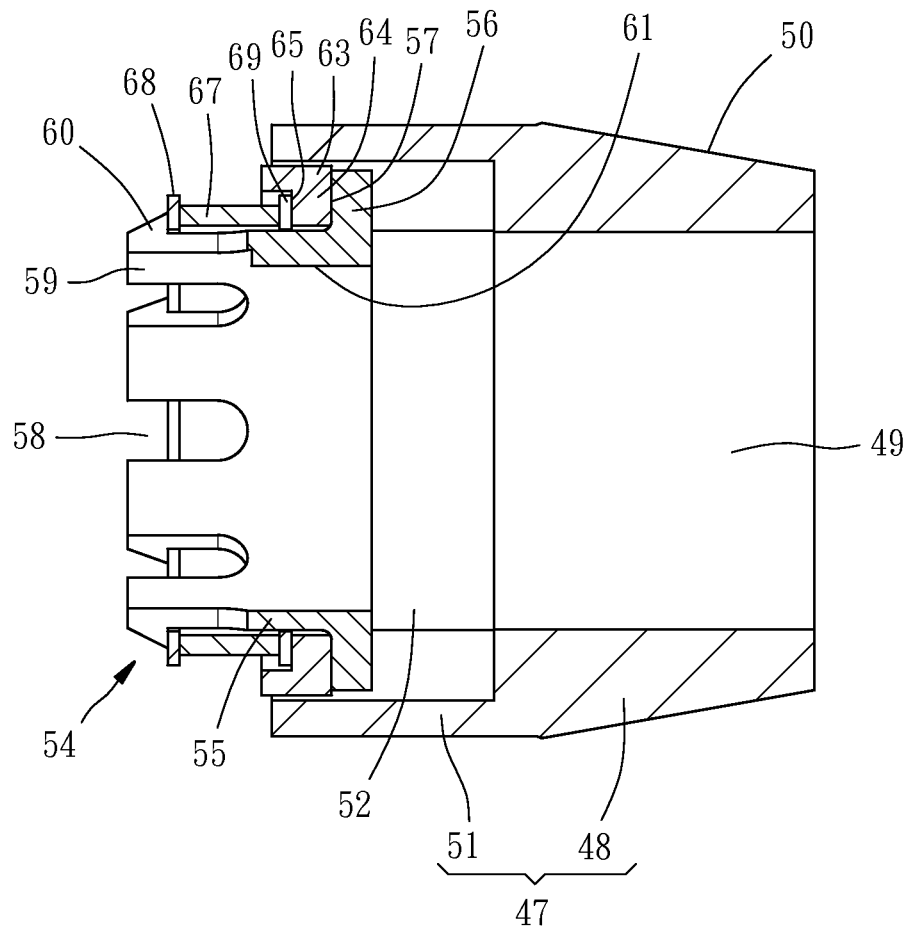
FIG. 4 is a cross-sectional view of assembly of the clutch of the present disclosure.

Please refer to FIG. 3, FIG. 4 and FIG. 8. The clutch 46 includes a clutch member 47, a first resistance member 54, a second resistance member 62 and an elastic member 67.

The clutch member 47 is made of metal material (or other suitable clutch material) and includes a clutch part 48 which has a threaded hole 49, and an opening of the threaded hole 49 is located at an end of the clutch member 47. The clutch member 47 is assembled into engagement with the screw part 42 of the chain sprocket 39 via the threaded hole 49, so that the clutch member 47 can be driven by the chain sprocket 39 to axially move along the axle 10. Moreover, the clutch part 48 is provided with an outer cone surface 50 which can work in cooperation with the inner cone surface 38 of the driving ring 37. In addition, the clutch member 47 further includes a sleeving part 51 which is linked to an end of the clutch part 48 and has a sleeving hole 52. An opening of the sleeving hole 52 is located at other end of the clutch member 47 and coaxially communicated with the threaded hole 49 of the clutch part 48, and the axle 10 passes through the opening of the sleeving hole 52. An aperture of the sleeving hole 52 is larger than that of the threaded hole 49. Further, the sleeving part 51 further includes two engagement grooves 53 which are located at two opposite sides of the sleeving hole 52 respectively and radially communicated with the sleeving hole 52.

The first resistance member 54 is made of plastic material (or other suitable material) and has a cylinder 55 and a ring flange 56. The ring flange 56 is located at one end of the cylinder 55 and has an outer diameter larger than that of the cylinder 55, so that a holding wall 57 is defined between the ring flange 56 and the cylinder 55. The cylinder 55 is provided with a plurality of groove portions 58 annularly arranged at other end thereof. A claw part 59 is formed between two adjacent groove portions 58, and each of the claw parts 59 has an outer flange 60 at an outer peripheral surface thereof. In addition, the inner peripheral surface of the cylinder 55 has a second plane portion 61. During assembling, the first resistance member 54 is sleeved onto the axle 10 and abutted against the first plane portion 15 of the axle 10 at the second plane portion 61 thereof, so that the first resistance member 54 cannot be rotated around the axle 10 and a part of the first resistance member 54 is located inside the sleeving hole 52 of the clutch member 47 after being fastened on the axle 10.

The second resistance member 62 is made of plastic material (or other suitable material) and has a ring sleeve part 63 and an inner flange 64. The ring sleeve part 63 is rotatably sleeved onto the cylinder 55 of the first resistance member 54, and the inner flange 64 is disposed on an inner ring surface of the ring sleeve part 63, such that a stepped surface 65 is formed between the inner flange 64 and the ring sleeve part 63. The second resistance member 62 is assembled inside the sleeving hole 52 of the clutch member 47. In addition, the ring sleeve part 63 of the second resistance member 62 is further provided with two opposite fastening parts 66 at an outer ring surface thereof. The two fastening parts 66 are located in the engagement grooves 53 of the sleeving part 51 of the clutch member 47, so that the second resistance member 62 can be driven by the clutch member 47 to rotate around the cylinder 55 of the first resistance member 54.

The elastic member 67 can be implemented as a spiral spring, wave spring or rubber element, but the present disclosure is not limited thereto. The elastic member 67 is sleeved onto the cylinder 55 of the first resistance member 54 and elastically abutted between the outer flange 60 of the first resistance member 54 and the stepped surface 65 of the second resistance member 62. The elastic member 67 provides an axial force to make an end surface of the ring sleeve part 63 of the second resistance member 62 to be closely abutted against the holding wall 57 of the first resistance member 54, so that the second resistance member 62 is biased to provide resistance to the clutch member 47 against rotation relative to the first resistance member 54 which in turn is rotationally fixed to the axle 10 through the mating planes 61 and 15.

It should be additionally explained that the clutch 46 of the present disclosure is further provided with two washers 68 and 69 in order to reduce the wear between the first resistance member 54, the second resistance member 62 and the elastic member 67 and increase the contacting areas therebetween. The washer 68 is sleeved onto the cylinder 55 of the first resistance member 54 and located between the outer flange 60 of the cylinder 55 and the elastic member 67, and the washer 69 is sleeved onto the cylinder 55 of the first resistance member 54 and located between the inner flange 64 of the second resistance member 62 and the elastic member 67.

Figure 9:
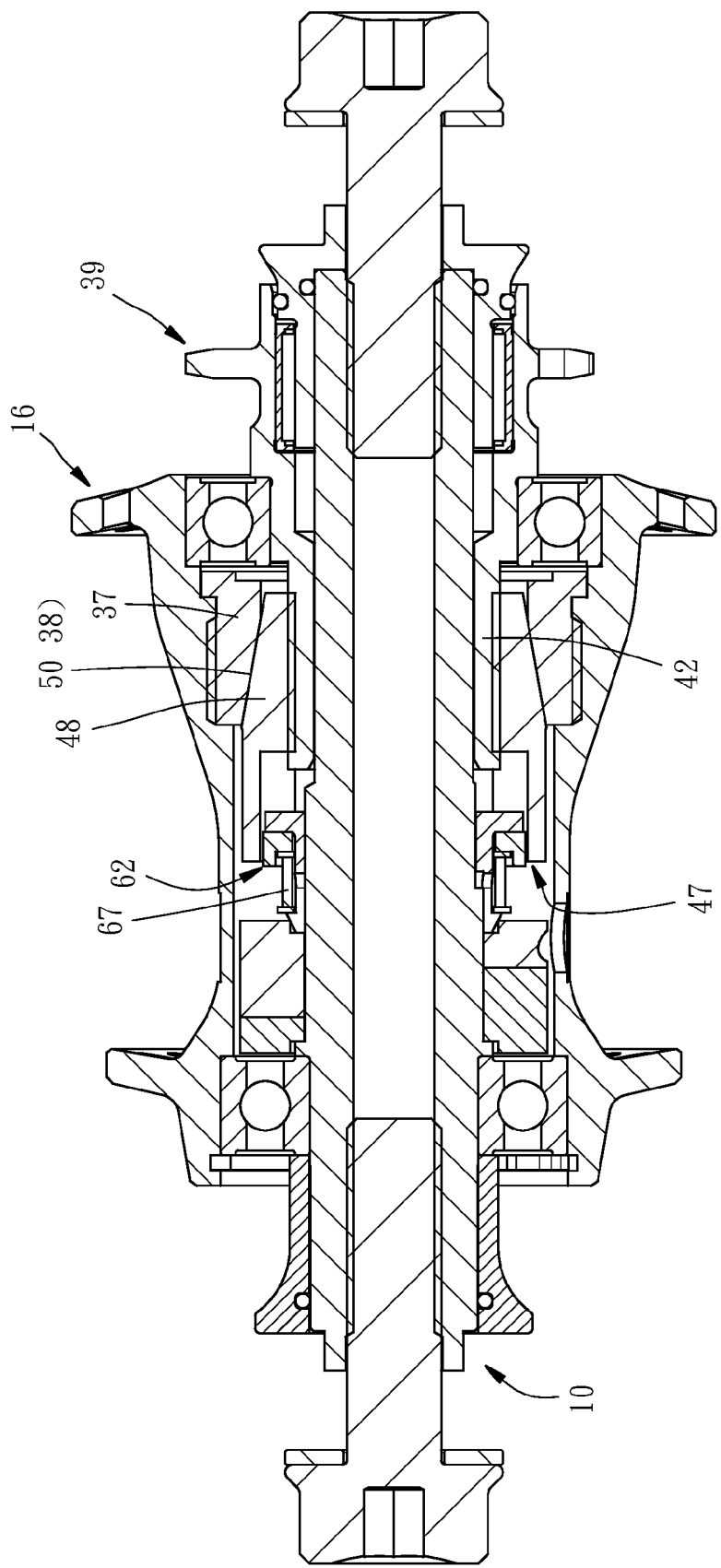
FIG. 9 is similar to the FIG. 8, showing that the driving ring is engaged by the clutch member.

According to aforesaid structure, when a rider does not push pedal yet, the chain sprocket 39 is kept still, in this time the clutch member 47 possibly stays in the position shown in the FIG. 8. In a condition that the clutch member 47 is located at the position shown in the FIG. 8, when the rider starts pushing the pedal, the chain sprocket 39 is driven to rotate by the chain, to enable the screw part 42 of the chain sprocket 39 to start driving the clutch member 47 to move toward the driving ring 37 (the direction indicated by an arrow in figures). During the movement, the clutch member 47 is not rotated around the axle 10 because of the resistance provided by the second resistance member 62. On the other hand, the clutch member 47 is spaced apart from the driving ring 37 by a distance, so the chain sprocket 39 is just driven to free rotate and cannot immediately drive the hub shell 16 to rotate when the rider starts pushing pedal. When the clutch member 47 has progressed axially such that the inner cone surface 38 of the driving ring 37 is engaged by the outer cone surface 50 of the clutch part 48 of the clutch member 47, as shown in FIG. 9, the clutch member 47 is stopped moving and a fastening state is formed between the clutch member 47 and the hub shell 16. As the rider keeps pushing the pedal, the fastening relationship between the clutch member 47 and the driving ring 37 can enable the chain sprocket 39 to drive the hub shell 16 to rotate, and meanwhile the clutch member 47 also overcomes the resistance applied by the second resistance member 62 due to the elastic member 67 to drive the second resistance member 62 to rotate around the first resistance member 54.

Figure 10:
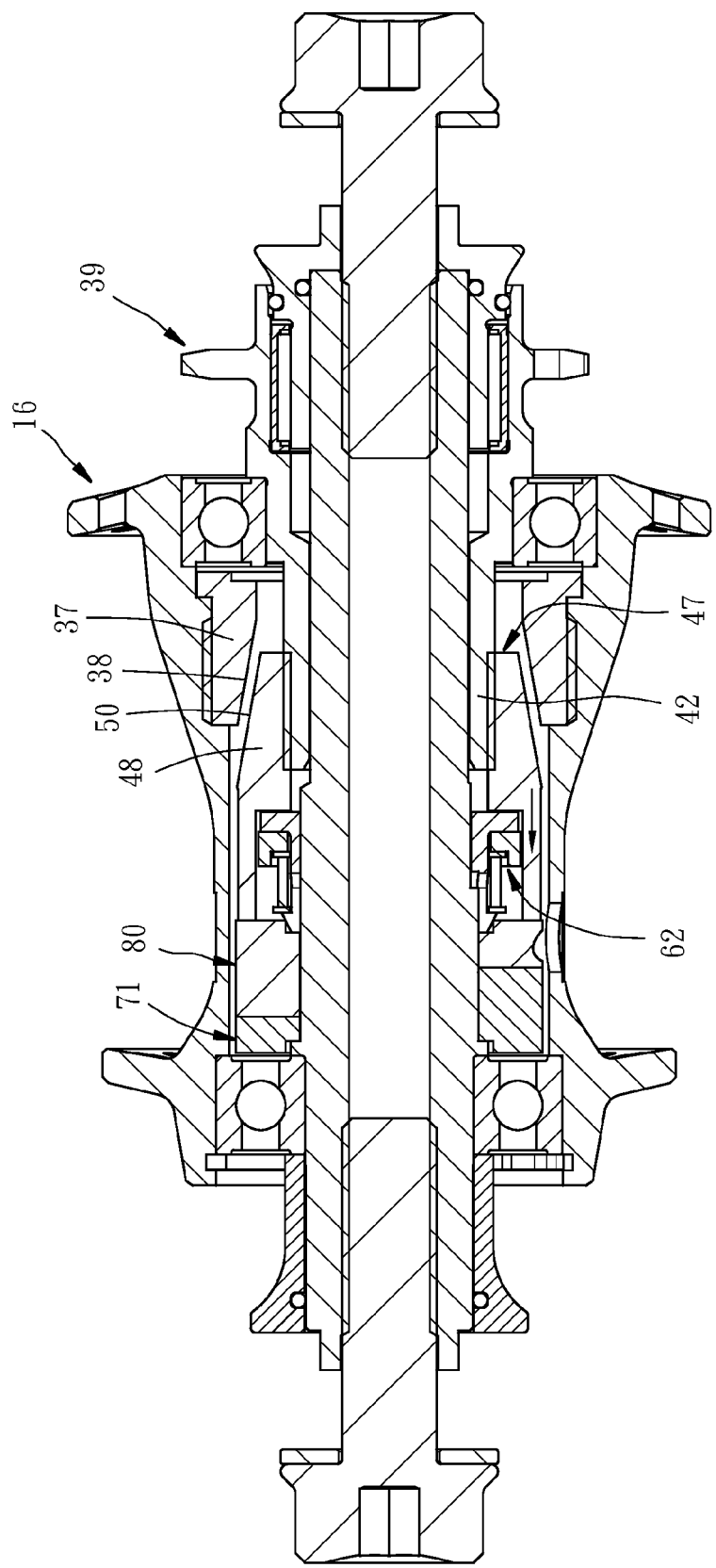
FIG. 10 is similar to the FIG. 9, showing that clutch member is disengaged from the driving ring.

As the hub shell 16 is rotated continuously, if the rider pushes the pedal in reverse, the screw part 42 of the chain sprocket 39 drives the clutch member 47 to move away from the driving ring 37 (i.e. the direction indicated by the arrow in the FIG), as shown in FIG. 10, during the movement, the clutch member 47 is also biased by the resistance provided by the second resistance member 62 to keep not-rotating. When the outer cone surface 50 of the clutch part 48 of the clutch member 47 is departed from the inner cone surface 38 of the driving ring 37, the fastening relationship between the clutch member 47 and the hub shell 16 is released and, in the meantime, the hub shell 16 is in freely rotatable state.

According to the above description, in the freecoaster hub 1 of the present disclosure, the second resistance member 62 of the clutch 46 provides constant resistance on the clutch member 47, such that engagement is reliable and consistent, compared with the conventional technology. Therefore, the driving power transmission can be maintained in a stable condition.

In order to adjust the amount of pedal movement the rider experiences before drive is achieved, it is necessary to adjust the stroke of the clutch 46 upon demand, the freecoaster hub 1 of the present disclosure further includes a clutch stroke adjusting device 70, as shown in FIG. 2, FIG. 5, FIG. 6 and FIG. 7. The clutch stroke adjusting device 70 includes a first adjusting member 71, a second adjusting member 80 and an urging member 89.

Figure 5:
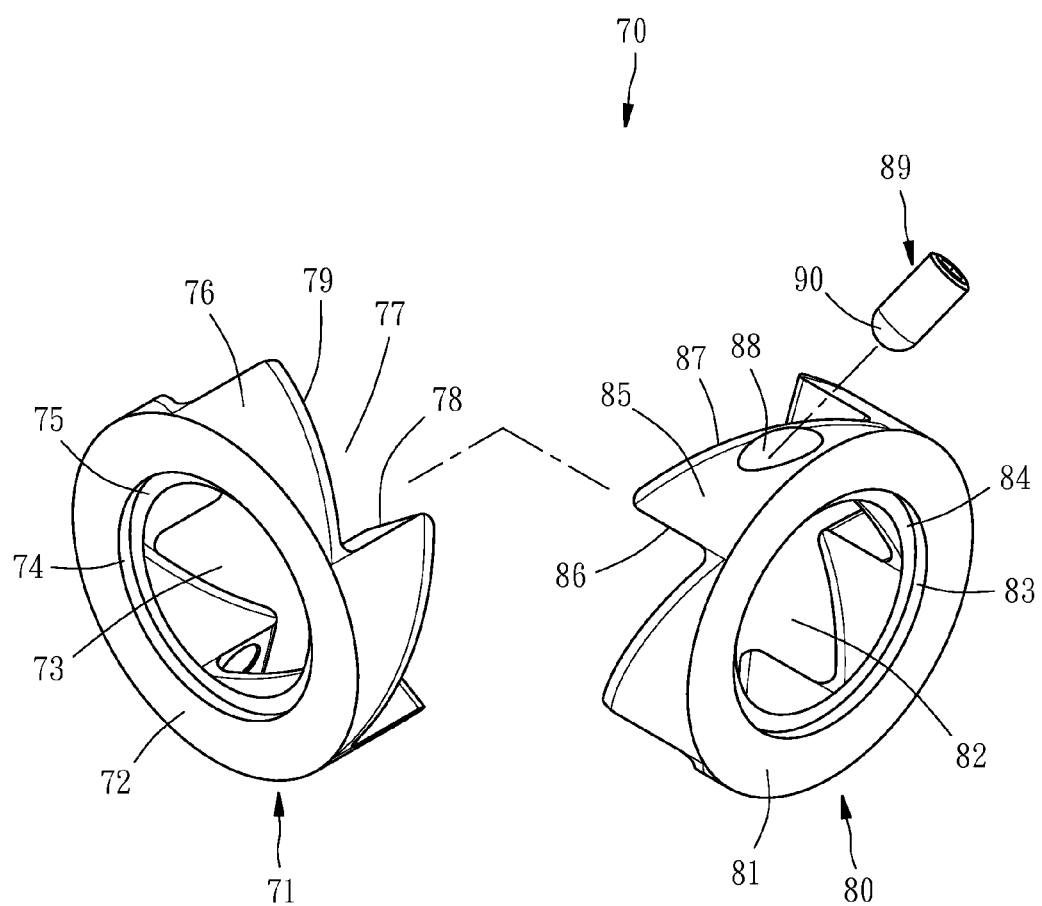
FIG. 5 is an exploded view of the clutch stroke adjusting device of the present disclosure.
Figure 6:
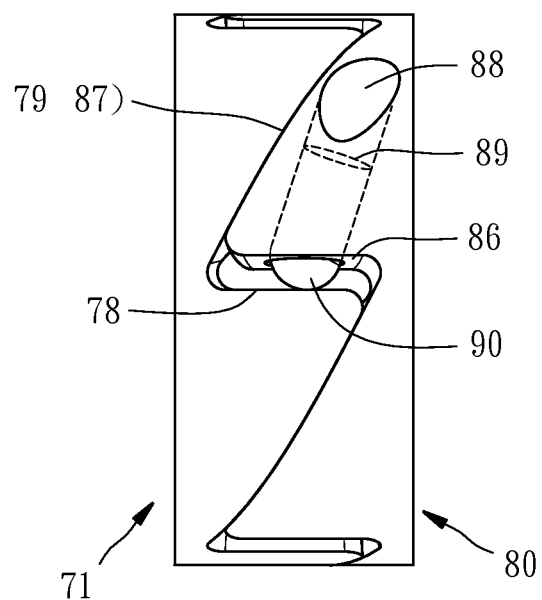
FIG. 6 is a lateral view of the clutch stroke adjusting device of the present disclosure, showing that the first adjusting member and the second adjusting member with the stroke close to maximum.
Figure 11:
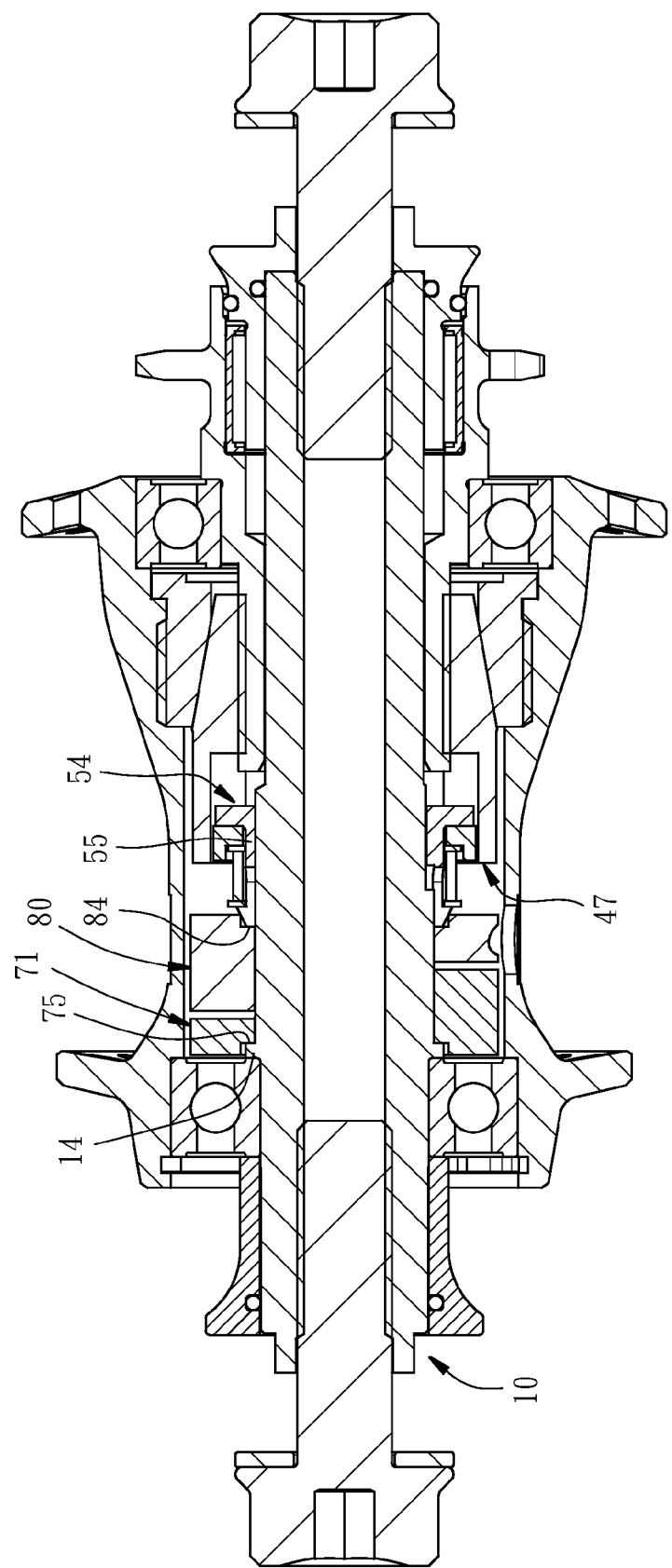
FIG. 11 is similar to the FIG. 9, showing that the first adjusting member and the second adjusting member are moved relative to each other to reduce clutch stroke.

The first adjusting member 71 is made of plastic material and has a first end wall 72, and the first end wall 72 is provided with a first axis hole 73 and a first ring groove 74. The first ring groove 74 is coaxially communicated with the first axis hole 73. A groove diameter of the first ring groove 74 is larger than an aperture of the first axis hole 73, so a first stopper part 75 is formed between the first ring groove 74 and the first axis hole 73. Therefore, as shown in FIG. 5 and FIG. 11, the first adjusting member 71 is sleeved onto the axle 10 via the first axis hole 73, and the first stopper part 75 is abutted against the first outer shoulder portion 14 of the axle 10, so as to complete the assembly of the first adjusting member 71 and the axle 10. In addition, the first adjusting member 71 is further provided with a ring wall 76 which extends outwardly from a side surface of the first end wall 72 and provided with a plurality of tooth grooves 77. Each of the tooth grooves 77 includes a first radial abutment surface 78 and a first guiding surface 79 linked with the first radial abutment surface 78. The first radial abutment surface 78 extends axially along the first axis hole 73, and the first guiding surface 79 extends helically around the first axis hole 73.

The second adjusting member 80 is made of plastic material. The second adjusting member 80 includes a second end wall 81 which is provided with a second axis hole 82 and a second ring groove 83. The second ring groove 83 is coaxially communicated with the second axis hole 82. A groove diameter of the second ring groove 83 is larger than an aperture of the second axis hole 82, so that a second stopper part 84 can be formed between the second ring groove 83 and the second axis hole 82. In addition, the second adjusting member 80 is provided with a plurality of tooth parts 85, and each of the tooth parts 85 extends outwardly from a side surface of the second end wall 81 and provided with a second radial abutment surface 86 and a second guiding surface 87 linked with the second radial abutment surface 86. The second radial abutment surface 86 extends axially along the second axis hole 82 and the second guiding surface 87 extends helically around the second axis hole 82. During assembling, the second adjusting member 80 is sleeved onto the axle 10 via the second axis hole 82, to fasten the tooth parts 85 of the second adjusting member 80 into the tooth grooves 77 of the first adjusting member 71. Moreover, as shown in the FIG. 11, the second adjusting member 80 is abutted against an end of the cylinder 55 of the first resistance member 54 by the second stopper part 84. After the assembling is completed, as shown in FIG. 2 and FIG. 11, the second adjusting member 80 is located between the clutch 46 and the first adjusting member 71. Moreover, as shown in the FIG. 6 and FIG. 7, the second radial abutment surfaces 86 of the tooth parts 85 of the second adjusting member 80 correspond to the first radial abutment surfaces 78 of the tooth grooves 77 of the first adjusting member 71, and the second guiding surfaces 87 of the tooth parts 85 of the second adjusting member 80 are abutted against the first guiding surfaces 79 of the tooth grooves 77 of the first adjusting member 71. In addition, the second adjusting member 80 further includes an adjusting hole 88, and a threaded hole is taken as example of the adjusting hole 88 in this embodiment. The adjusting hole 88 is located on one of the tooth parts 85 and extends from the outer peripheral surface of the tooth part 85 to the second radial abutment surface 86 of the tooth part 85, and communicated with the radial hole 25 of the hub shell 16 correspondingly. For convenience the first adjustment member 71 and the second adjusting member 80 may be identical.

An urging member 89 (a socket set screw being taken as an example of the urging member 89 here) is screwed with the adjusting hole 88 of the second adjusting member 80, to enable the urging member 89 to be longitudinally movable along a central axle direction (i.e. the axis of the adjusting hole 88) thereof. And, the urging member 89 is provided with an urging end 90 which is shaped a ball and configured for being abutted against the first radial abutment surface 78 of one of the tooth grooves 77 of the first adjusting member 71.

Figure 7:
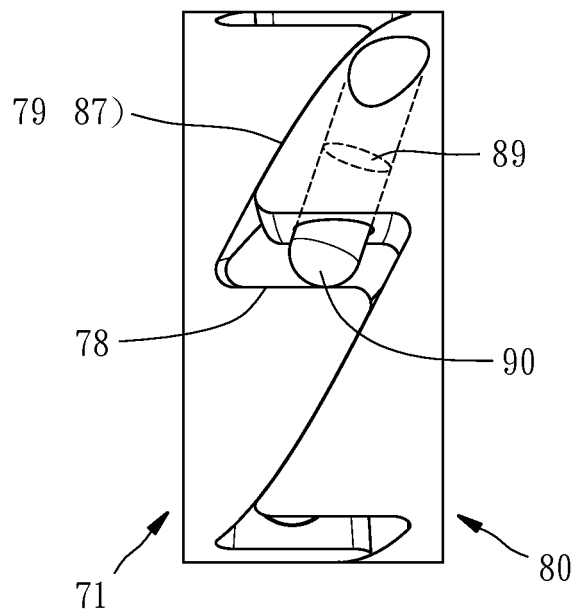
FIG. 7 is similar to the FIG. 6, showing that the first adjusting member and the second adjusting member are moved relative to each other to reduce the stroke of the clutch.

During practical adjustment, the dust-proof cover 26 is detached from the groove 24 of the hub shell 16 to expose the radial hole 25 first, and a screwdriver is then used to insert into the adjusting hole 88 of the second adjusting member 80 via the radial hole 25 of the hub shell 16, to adjust the position of the urging member 89. When the urging member 89 is moved downwardly along the axis of the adjusting hole 88, the urging end 90 of the urging member 89 is protruded out of the adjusting hole 88 and pushes against one of the first radial abutment surfaces 78 of the tooth grooves 77 of the first adjusting member 71, causing the first and second guiding surfaces 79 and 87 to slide over one another. As the first adjusting member 71 moves against the second adjusting member 80, the total axial length of the clutch stroke adjusting device 70 assembly increases. As shown in FIG. 7 and FIG. 11, since the first stopper part 75 is abutted against the first outer shoulder portion 14 of the axle 10 to make the first adjusting member 71 unable to move axially any further in that direction, according to the spiral cooperation between the first guiding surface 79 and the second guiding surface 87, the second adjusting member 80 is moved apart from the first adjusting member 71 and the second stopper part 84 pushes the first resistance member 54 during the rotation. Therefore, the distance between the second adjusting member 80 and the driving ring 37 can be shortened and the axial movement space of the clutch member 47 restricted and therefore the purpose of adjusting stroke can be achieved.

For restoring the original stroke distance of the clutch member 47, the screwdriver is also inserted into the adjusting hole 88 of the second adjusting member 80 via the radial hole 25 of the hub shell 16, to reversely rotate the urging member 89 to relieve the pushing force of the urging end 90 of the urging member 89 for the first radial abutment surfaces 78 of the tooth grooves 77 of the first adjusting member 71 and, at this time, the second adjusting member 80 is still stopped at the position after the movement. Next, the clutch member 47 can be driven by the reverse rotation of the chain sprocket 39 to move toward the second adjusting member 80 (as shown in the FIG. 10) until the second adjusting member 80 is pushed to abut with the first adjusting member 71.

Therefore, by means of the cooperation between the first and second adjusting members 71 and 80 of the clutch stroke adjusting device 70 and the operation of the urging member 89, the stroke of the clutch 46 can be adjusted without disassembling the freecoaster hub 1 of the present disclosure, and the special process performed on the axle 10 in prior art is also not required for the freecoaster hub 1 of the present disclosure, so that the purpose of reducing processing cost and increasing adjusting convenience can be achieved whilst maintaining axle strength.

On the other hand, when the freecoaster hub 1 of the present disclosure is born an axial load in the direction of the first end 11 or the second end 12 of the axle 10, the first inner ring 28 of the first ball bearing unit 27 is positioned between the first outer shoulder portion 14 of the axle 10 and the distal end of the first end collar 32, and the first outer ring 29 of the first ball bearing unit 27 is positioned between the first inner shoulder portion 21 and the retaining element 31 of the hub shell 16, so the first ball bearing unit 27 has sufficient location to bear all of the axial load and locates the entire wheel axially relative to the axle 10. However, as the stiffness of the assembly of the first ball bearing unit 27 cannot be infinite, some axial deflection must be transmitted to the second ball bearing 33 via the hub shell 16 and then transmitted to the chain sprocket 39 via the second ball bearing 33. In this case, the needle roller bearing unit 45 disposed inside the chain sprocket 39 is axially movable along the axle 10 in the limited space formed between the third inner shoulder portion 40 of the chain sprocket 39 and the third outer shoulder portion 44 of the second end collar 43, so the needle roller bearing unit 45 cannot provide a reaction force to the axial displacement transmitted from the chain sprocket 39 by its axial displacement, and the structure of the freecoaster hub 1 can be further protected from being damaged. In addition, while the clutch member 47 and the hub shell 16 are engaged with and then separated from each other, the chain sprocket 39 repeatedly converts the driving torque into an axial load because of the action of the screw part 42 of the chain sprocket 39 into the clutch member 47, and at this time, the needle roller bearing unit 45 can similarly buffer the potential load transmitted from the chain sprocket 39 by its axial displacement, so as to obtain the protective effect.

Figure 12:
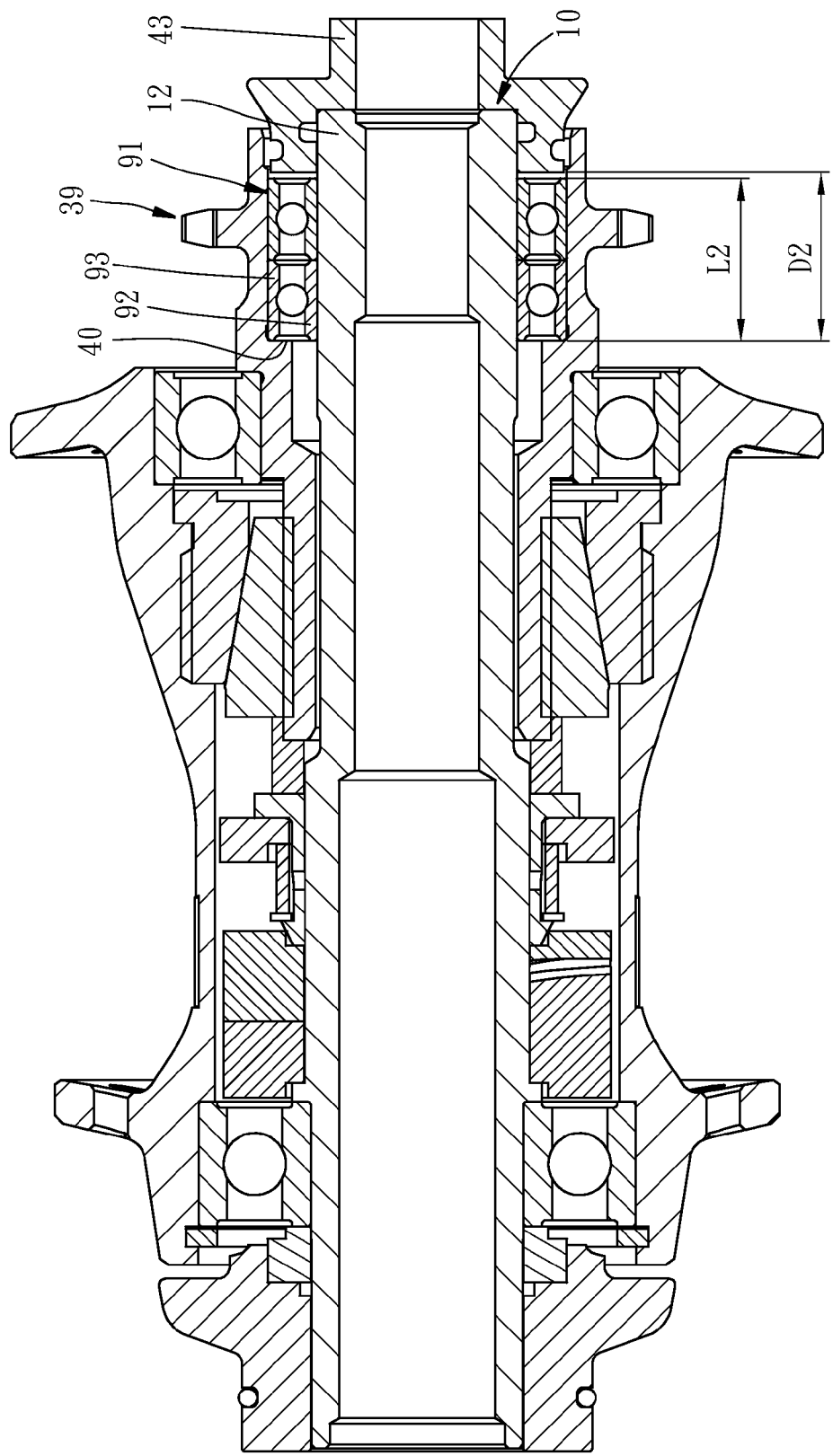
FIG. 12 is a cross-sectional view of other embodiment of the present disclosure, showing that the needle roller bearing is replaced by the ball bearings.

It should be additionally explained that the needle roller bearing unit 45 can be replaced by two further ball bearing units 91 arranged in parallel with each other, as shown in FIG. 12. The third ball bearing units 91 are disposed between the third inner shoulder portion 40 of the chain sprocket 39 and the inner end surface of the second end collar 43 and each is provided with a third inner ring 92 and a third outer ring 93. The third inner ring 92 is sleeved onto the second end 12 of the axle 10 by a loose fit manner, and the third outer ring 93 is fastened on the inner peripheral surface of the chain sprocket 39 by a tight fit manner. Moreover, a sum L2 of the axial lengths of the two further ball bearing units 91 is smaller than the distance D2 between the third inner shoulder portion 40 of the chain sprocket 39 and the inner end surface of the second end collar 43. Therefore, the third ball bearing units 91 can be axially movable along the axle 10 between the third inner shoulder portion 40 and the second end collar 43 of the chain sprocket 39, and the third ball bearing units 91 may prevent the axial force of torque transmitted from the chain sprocket 39 by its axial displacement, and the structure of the freecoaster hub 1 can be further protected from being damaged. In addition, it should be additionally explained that the third ball bearing units 91 is not necessary to be two in number, and at least one third ball bearing units 91 can also achieve the desired effect actually. Similarly the third ball bearing units 91 could be replaced by a plain bearing or other known bearing means that do not provide a fixed axial location.

In conclusion, the freecoaster hub 1 of the present disclosure can fully locate the first ball bearing unit 27, and eliminate any axial location duties from the bearing units of the chain sprocket 39, so that the whole structure can better tolerate axial forces and be less complex. In addition, by incorporating with the movable design in needle roller bearing unit 45 or the further ball bearing units 91, it can ensure that the structures of the chain sprocket 39, the first ball bearing unit 27 and the second ball bearing 33 are not easy to be damaged while being born too large axial force or torque, so that the objectives of the present disclosure can be achieved.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A bicycle freecoaster hub, comprising:
an axle;
a hub shell rotatably sleeved onto the axle;
a chain sprocket rotatably sleeved onto one end of the axle and having a screw part inserted into the hub shell via one end of the hub shell; and
a clutch disposed inside the hub shell and including a clutch member, a first resistance member, a second resistance member and an elastic member, the clutch member provided with a threaded hole and a sleeving hole coaxially communicated with the threaded hole, and the axle passing through the threaded hole and the sleeving hole both, the threaded hole screwed to the screw part of the chain sprocket, openings of the threaded hole and the sleeving hole located at two ends of the clutch member, respectively;
the first resistance member disposed inside the sleeving hole of the clutch member and provided with a cylinder and a ring flange, the cylinder mounted on the axle and provided with at least one outer flange at one end thereof, the ring flange located at the other end of the cylinder and having an outer diameter larger than that of the cylinder, such that a holding wall is defined at a junction portion between the ring flange and the cylinder;
the second resistance member provided with a ring sleeve part and an inner flange, the ring sleeve part disposed on the clutch member and rotatably sleeved onto the cylinder of the first resistance member, an outer ring surface of the ring sleeve part located inside a periphery wall of the sleeving hole of the clutch member, an end surface of the ring sleeve part abutted against the holding wall of the first resistance member, the inner flange located on an inner ring surface of the ring sleeve part to form a stepped surface between the inner flange and the ring sleeve part;
the elastic member sleeved onto the cylinder of the first resistance member and elastically abutted between the outer flange of the first resistance member and the stepped surface of the second resistance member.

2. The bicycle freecoaster hub as defined in claim 1, wherein the cylinder of the first resistance member is provided with a plurality of grooves annularly arranged at one end thereof, and a plurality of claw parts formed between the two adjacent ones of the grooves respectively, and each of the claw parts is provided with the outer flange at outer peripheral surface thereof.

3. The bicycle freecoaster hub as defined in claim 1, wherein the clutch member comprises a clutch part provided with the threaded hole and a sleeving part linked with the clutch part and provided with the sleeving hole, the sleeving part having an engagement groove radially communicated with the sleeving hole, the ring sleeve part of the second resistance member having a fastening part fastened in the engagement groove of the sleeving part of the clutch member.

4. The bicycle freecoaster hub as defined in claim 1, further comprising a driving ring which is mounted in the hub shell and provided with an inner cone surface, wherein the clutch part of the clutch member is provided with an outer cone surface abutted against the inner cone surface of the driving ring.

5. The bicycle freecoaster hub as defined in claim 1, wherein the clutch further comprises two washers which are disposed at two ends of the elastic member respectively.

6. The bicycle freecoaster hub as defined in claim 1, wherein the axle is provided with a first plane portion, the cylinder of the first resistance member is provided with a second plane portion abutted against the first plane portion of the axle.

7. The bicycle freecoaster hub as defined in claim 1, further comprising a clutch stroke adjusting device which is disposed inside the hub shell and includes a first adjusting member, a second adjusting member, and an urging member, the first adjusting member having a first end wall and a ring wall, the first end wall having a first axis hole rotatably sleeved onto the axle, the ring wall extending outwardly from a side surface of the first end wall and having at least one tooth groove which has a first radial abutment surface and a first guiding surface linked with the radial abutment surface, the second adjusting member located between the clutch and the first adjusting member and comprising a second end wall, at least one tooth part, and an adjusting hole, the second end wall having a second axis hole rotatably sleeved onto the axle, the tooth part extending outwardly from a side surface of the second end wall and engaged with the tooth groove of the first adjusting member, the tooth part having a second radial abutment surface and a second guiding surface linked with the second radial abutment surface, the second radial abutment surface corresponding to the first radial abutment surface of the tooth groove of the first adjusting member, the second guiding surface abutted against the first guiding surface of the tooth groove of the first adjusting member, the adjusting hole penetrating the tooth part from the outer peripheral surface of the tooth part to the second radial abutment surface of the tooth part and corresponding to a radial hole of the hub shell, the urging member movably disposed inside the adjusting hole of the second adjusting member, and having an urging end which is protruded out of the adjusting hole and abutted against the first radial abutment surface of the tooth groove of the first adjusting member.

8. The bicycle freecoaster hub as defined in claim 7, wherein the first adjusting member is provided with the plurality of tooth grooves at the ring wall thereof, and the second adjusting member is provided with the plurality of tooth parts, and the adjusting hole is located on one of the tooth parts.

9. The bicycle freecoaster hub as defined in claim 7, wherein the first radial abutment surface of the tooth groove extends along the axis of the first axis hole, and the first guiding surface of the tooth groove extends helically around the first axis hole, and the second radial abutment surface of the tooth part extends along the axis of the second axis hole, and the second guiding surface of the tooth part extends helically around the second axis hole.

10. The bicycle freecoaster hub as defined in claim 7, wherein the urging member is screwed into the adjusting hole.

11. The bicycle freecoaster hub as defined in claim 7, wherein the axle is provided with an outer shoulder portion at the outer peripheral surface thereof, and the first adjusting member is provided with a first ring groove at the first end wall thereof, and the first ring groove is coaxially communicated with the first axis hole and has a groove diameter larger than an aperture of the first axis hole, such that a first stopper part is formed between the first ring groove and the first axis hole to be abutted against the outer shoulder portion of the axle.

12. The bicycle freecoaster hub as defined in claim 7, wherein the second adjusting member is provided with a second ring groove at the second end wall thereof, and the second ring groove is coaxially communicated with the second axis hole and has a groove diameter larger than an aperture of the second axis hole, such that a second stopper part is formed between the second ring groove and the second axis hole to be abutted against one end of the cylinder of the first resistance member.

13. The bicycle freecoaster hub as defined in claim 7, wherein the hub shell is provided with a groove on the outer peripheral surface thereof and the radial hole is located in the groove; a dust-proof cover is detachably disposed inside the groove to block the radial hole.

14. The bicycle freecoaster hub as defined in claim 1, further comprising a first ball bearing unit, a positioning member, a first end collar, a second ball bearing unit and a second end collar, the axle having a first end and a second end, the first end provide with a first outer shoulder portion at an outer peripheral surface thereof, the chain sprocket sleeved onto the second end of the axle, the hub shell having a first flange and a second flange, an inner peripheral surface of the first flange provided with a first inner shoulder portion and a first bearing seat abutted with the first inner shoulder portion, an inner peripheral surface of the second flange having a second bearing seat, the first ball bearing unit sleeved onto the first end of the axle and disposed inside the first bearing seat of the hub shell, an inner end surface of the first ball bearing unit abutted against the first outer shoulder portion of the axle and the first inner shoulder portion of the hub shell, the positioning member mounted in the first flange of the hub shell and abutted against an outer end surface of the first ball bearing unit, the first end collar disposed at the first end of the axle and abutted against the outer end surface of the first ball bearing unit, the second ball bearing unit sleeved onto the second end of the axle and disposed inside the second bearing seat of the hub shell, the second end collar disposed at the second end of the axle.

15. The bicycle freecoaster hub as defined in claim 14, wherein the hub shell has a retaining ring groove disposed on the inner peripheral surface of the first flange thereof and abutted with the first bearing seat, and the positioning member is fastened inside the retaining ring groove.

16. The bicycle freecoaster hub as defined in claim 14, wherein the first ball bearing unit has a first inner ring provided with inner and outer end surfaces thereof abutted against the first outer shoulder portion of the axle and the distal end of the first end collar, respectively, and a first outer ring provided with inner and outer end surfaces thereof abutted against the first inner shoulder portion of the hub shell and the retaining member, respectively.

17. The bicycle freecoaster hub as defined in claim 14, wherein the hub shell has a second inner shoulder portion disposed on the inner peripheral surface of the second flange and abutted with the second bearing seat, and the chain sprocket has a second outer shoulder portion at the outer peripheral surface thereof, and an inner end surface of the second ball bearing unit is abutted against the second inner shoulder portion of the hub shell, and an outer end surface of the second ball bearing unit is abutted against the second outer shoulder portion of the chain sprocket.

18. The bicycle freecoaster hub as defined in claim 17, wherein the second ball bearing unit has a second inner ring provided with an outer end surface thereof abutted against the second outer shoulder portion of the chain sprocket and a second outer ring provided an inner end surface thereof abutted against the second inner shoulder portion of the hub shell.

19. The bicycle freecoaster hub as defined in claim 14, further comprising a needle roller bearing unit, the chain sprocket having an inner shoulder portion at the inner peripheral surface thereof, the second end collar inserted into the chain sprocket, the second end collar having a third outer shoulder portion at an outer peripheral surface thereof, the third outer shoulder portion corresponding to the third inner shoulder portion of the chain sprocket, the needle roller bearing unit sleeved onto the second end collar and located between the third inner shoulder portion of the chain sprocket and the third outer shoulder portion of the second end collar, the needle roller bearing unit having an axial length smaller than the distance between the third inner shoulder portion of the chain sprocket and the third outer shoulder portion of the second end collar.

20. The bicycle freecoaster hub as defined in claim 14, further comprising a third ball bearing unit disposed between the second end of the axle and the chain sprocket, the chain sprocket having a third inner shoulder portion at the inner peripheral surface thereof, the second end collar disposed at the second end of the axle, the third ball bearing unit located between the third inner shoulder portion of the chain sprocket and the inner end surface of the second end collar, the third ball bearing unit having an axial length smaller than a distance between the third inner shoulder portion of the chain sprocket and the inner end surface of the second end collar.

* * * * *